United States Patent
Wong et al.

(10) Patent No.: US 7,921,321 B2
(45) Date of Patent: Apr. 5, 2011

(54) AUTOMATIC CLOCK AND DATA ALIGNMENT

(75) Inventors: Thomas S. Wong, San Jose, CA (US); Ulrich Bruedigam, Frankfurt (DE)

(73) Assignee: Micrel, Inc., San Jose, CA (US)

( * ) Notice: Subject to any disclaimer, the term of this patent is extended or adjusted under 35 U.S.C. 154(b) by 797 days.

(21) Appl. No.: 11/946,816

(22) Filed: Nov. 28, 2007

(65) Prior Publication Data

US 2009/0138742 A1 May 28, 2009

(51) Int. Cl.
*G06F 1/14* (2006.01)
*G06F 1/24* (2006.01)
*G06F 11/00* (2006.01)

(52) U.S. Cl. ......... 713/503; 713/500; 713/502; 713/600

(58) Field of Classification Search .................. 713/500, 713/502, 503, 600
See application file for complete search history.

(56) References Cited

U.S. PATENT DOCUMENTS

| | | | |
|---|---|---|---|
| 7,069,458 B1 * | 6/2006 | Sardi et al. | 713/401 |
| 7,167,995 B2 * | 1/2007 | Chiang | 713/503 |
| 7,756,232 B2 * | 7/2010 | Aoki et al. | 375/355 |
| 2003/0193424 A1 * | 10/2003 | Chiang | 341/100 |
| 2006/0181914 A1 * | 8/2006 | Ferraiolo et al. | 365/89 |
| 2007/0047686 A1 * | 3/2007 | Aoki et al. | 375/374 |
| 2007/0083786 A1 * | 4/2007 | Chiang | 713/500 |
| 2007/0140397 A1 * | 6/2007 | Jaussi et al. | 375/371 |
| 2009/0006730 A1 * | 1/2009 | Gara et al. | 711/105 |

* cited by examiner

*Primary Examiner* — Thomas Lee
*Assistant Examiner* — Jaweed A Abbaszadeh
(74) *Attorney, Agent, or Firm* — Patent Law Group LLP

(57) ABSTRACT

A circuit is described for automatically adjusting a phase of an input register load clock to be synchronized with transitions of data bits forming an n-bit word. The circuit detects the first transition of a data bit in the n-bit word. The circuit then time-shifts the input clock, to generate a shifted clock, so that a triggering edge of the shifted clock occurs sometime after generation of the transition detect signal, such as in the middle third of a data cycle. Shifting the input clock may be performed by multiplying the input clock to generate a plurality of sub-clock cycles and selecting one of the sub-clock cycles as the start of the shifted clock cycle. The parallel data are applied to inputs of input registers clocked using the shifted clock as the load clock. Thus, the load clock occurs at an optimum time near the middle of a data cycle.

19 Claims, 10 Drawing Sheets

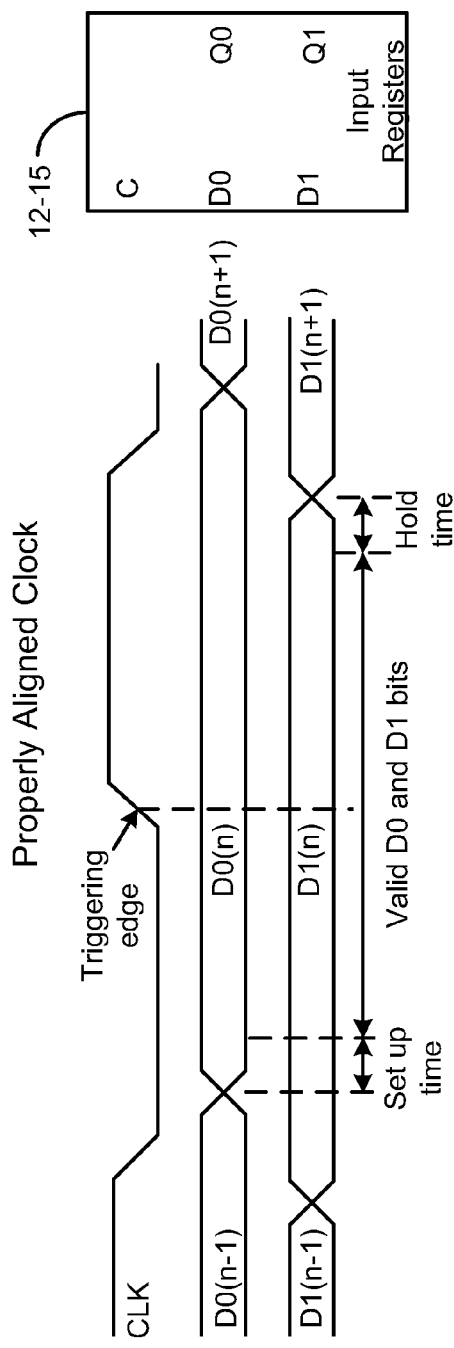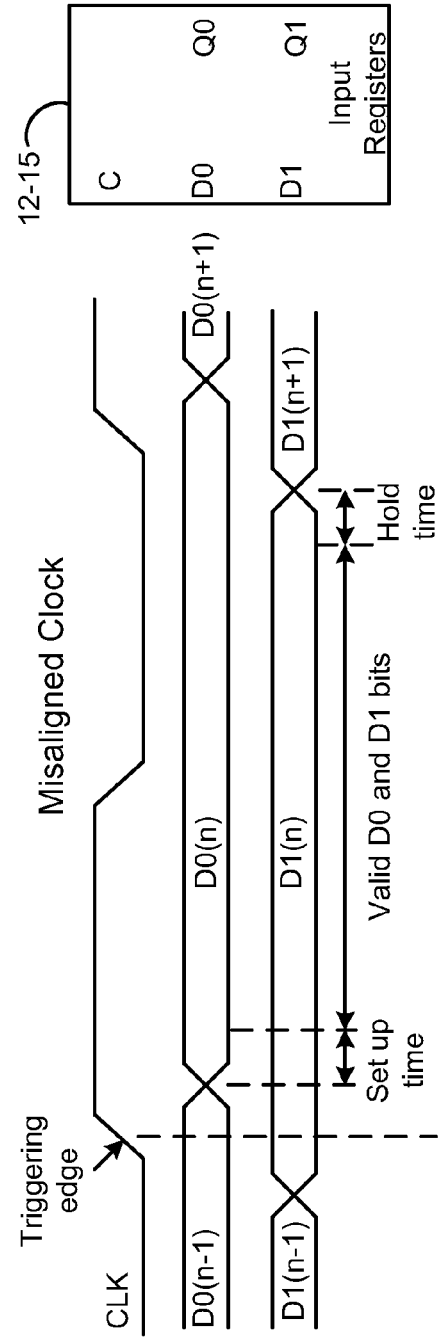

| Fig. 6B<br>(Transition detectors) | Fig. 6D<br>(Input registers and parallel-to-serial converter) |
|---|---|
| Fig. 6C<br>(CLKin shifter. 2-Bit counter synchronized with transition detection and 4xCLKin for clocking input registers) | Fig. 6E<br>(Load clock. 2-Bit counter synchronized with Fig. 6C for clocking the loading of a parallel-to-serial converter and clocking out serial bits) |

Fig. 6A

AUTOMATIC CLOCK AND DATA ALIGNMENT

FIELD OF THE INVENTION

This invention relates to digital circuits that receive binary data signals along with a separate clock signal for sampling the data signals and, in particular, to a circuit feature that improves synchronization between the clock signal and the data signals.

BACKGROUND

FIG. 1 illustrates a conventional digital circuit 10 that receives four data bits (D0-D3) in parallel at four data input terminals, to form a 4-bit word, along with a clock at a fifth input terminal. The data is in non-return to zero (NRZ) code (no neutral states). The clock signal received by circuit 10 is typically the same clock signal used by the transmitter to clock out the data transmitted to the circuit 10.

In a typical circuit, the leading edge of the clock pulse acts as the trigger for input registers to store the data levels occurring at the time of the clock's leading edge. In FIG. 1, the input registers are D flip flops 12-15. In a D flip-flop, the data clocked in is applied at the Q output of the flip-flop at the leading edge of the clock pulse. Ideally, the data communication system is designed so that the leading edge of the clock (which triggers the input registers) occurs at about the midpoint between the data transition times to ensure that all the parallel data bits during a single cycle have transitioned, if at all, for that cycle.

FIG. 2A illustrates an example of a properly aligned clock, where the triggering edge occurs at about the midpoint between the data transition times. Only two data bits, D0 and D1, are shown for simplicity. If the propagation times were identical for all the data and clock paths, and the transmitter transmitted the clock and data signals with the alignment shown in FIG. 2A, then all sampled data will be accurate at the outputs of the flip-flops 12-15 (FIG. 1). As long as the leading edge of the clock occurs after all the data bits have transitioned, if at all, in a given data cycle, the 4-bit word stored in the registers will be accurate. Finite set-up and hold times of the data relative to the clock avoid metastable states but further reduce the valid data window.

When different propagation delays occur in the data and clock paths, proper input register clocking is not assured.

FIG. 2B illustrates the same transmitted signals as in FIG. 2A but where the propagation times of the data and clock signals are not the same. This may be due to different conductor lengths for the data and clock signals, or different loads on the clock and data lines, or different processing of the clock and data signals. In FIG. 2B, the leading edge of the clock signal has shifted outside of the valid data window due to different propagation delays during the transmission and/or reception of these three signals. Accordingly, in the example of FIG. 2B, the leading edge of the clock will trigger the input registers to store the D0 and D1 bits from two different data cycles, resulting in an incorrect 4-bit word clocked into and out of the input registers.

In the example of FIG. 1, the flip-flops 12-15 input the 4-bit word into a parallel-to-serial converter 18. A phase locked loop (PLL) clock multiplier 20 multiplies the input clock by 4×. The 4× clock is then used to clock out the serial data from a shift register, forming the output section of the converter 18, after each loading of a 4-bit word into the shift register.

What is needed is a circuit technique that can adjust a clock signal for triggering an input register, where the triggering edge of the clock signal is properly aligned or synchronized with the data transitions even when the data and clock paths have different propagation delays.

SUMMARY

In one embodiment of the invention, an input clock is received along with parallel data bits. The input clock signal is then multiplied by, for example, four. The data bits are detected for any transitions between any of the 4× clock cycles. Upon detection of a transition of any one of the data bits, the triggering edge of the input clock (for clocking input registers) is time-shifted to occur about two of the 4× clock periods after the first data transition (near the middle of the data cycle). This ensures that the transitioned bit is stored in the input register. Positioning the leading clock edge near the midpoint of the data cycle of the first transitioned data bit also greatly increases the likelihood that the remainder of the data will have transitioned, if at all, prior to the leading edge of the shifted clock edge, since it is likely that all the data bits have generally similar propagation delays. The shifted input clock triggers all the data input registers at the same time to temporarily store the 4-bit word until the word is clocked out at the start of the next clock cycle. The 4-bit word is then processed by a downstream circuit, such as a parallel-to-serial converter.

In another embodiment, the clock may be shifted by any fraction of a data cycle after the first data transition. The multiplier of the input clock determines the precision of the location of the leading edge of the shifted input clock relative to the first data transition.

In another embodiment, a simple controllable delay circuit shifts the input clock so that the triggering edge is synchronized with the first data transition.

As seen, the shifted input clock is made synchronous with respect to the first transition of a data bit to be clocked so that the clock phase is optimum relative to the data cycle phase. This technique ensures valid data recovery irrespective of the input clock propagation delay relative to the data propagation delay.

The invention may also be implemented where the triggering of registers occurs on the trailing edge of the clock.

If the input registers output the data bits to a parallel-to-serial converter, a multiplied clock is already needed for the converter to clock out the serial data from a shift register, and the multiplied clock signal may also be used for shifting the input clock for the input registers.

BRIEF DESCRIPTION OF THE DRAWINGS

FIG. 2A illustrates a properly aligned clock relative to the data signals.

FIG. 2B illustrates potential problems with the circuit of FIG. 1 when the propagation delay of the clock signal is different from the propagation delays of the data signals.

FIG. 6A illustrates how to combine the circuit schematic portions of FIGS. 6B-6E and identifies the general functions of each of the circuit portions.

Elements labeled with the same numeral may be equivalent or identical.

DETAILED DESCRIPTION

Figure 3:
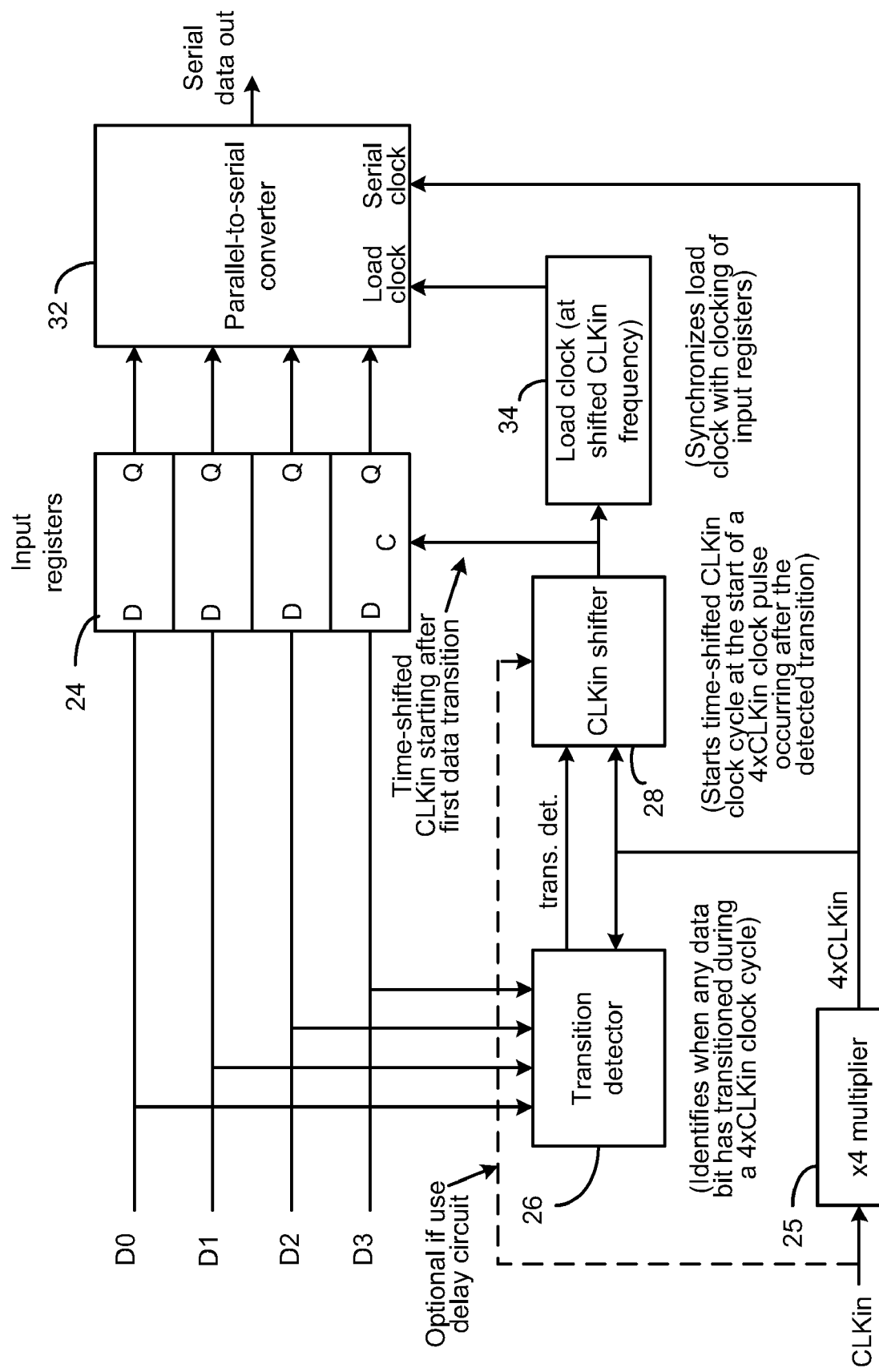
FIG. 3 illustrates high level circuit functions for carrying out one embodiment of the invention, where the invention is used for clocking a 4-bit word into a parallel-to-serial converter.

FIG. 3 illustrates one embodiment of a circuit for synchronizing a clock signal to data transitions to ensure valid data recovery.

An upstream circuit (not shown) generates parallel NRZ data bits D0-D3 during a data cycle. The upstream circuit or another circuit generates a clock signal (CLKin) that is intended to be used for clocking bits D0-D3 into respective input registers for further processing of the data bits. It is assumed that the CLKin period is equal to the data cycle period, although the phases of the periods may be arbitrarily skewed relative to one another by different propagation delays. In the examples given, the leading edge of CLKin is used for triggering the input registers. The invention can also be applied to circuits where the trailing edge of the clock triggers the input registers. It is not necessary for the invention that the data bits use the NRZ code since any code using a clock can benefit from the present invention.

The data bits D0-D3 are applied to the inputs of input registers 24. The registers 24 are shown as D-type flip-flops, where the D input becomes the Q output at the clock trigger. The Q output is therefore the D input delayed by up to one clock cycle.

The CLKin signal is multiplied by any conventional multiplier 25. In the example, the CLKin signal is multiplied by 4×. Such a multiplier 25 may be a digital phase-locked loop (PLL) multiplier, where the CLKin signal is applied to a non-inverting input of a phase detector (e.g., a differential amplifier or comparator). The output of the phase detector is connected to the input of a voltage controlled oscillator (VCO), whose output supplies the multiplied clock. As a negative feedback signal, the output of the VCO is divided by four and applied to the inverting input of the phase detector. The VCO will output a 4× clock signal so that the phases of the two input signals into the phase detector are matched. Any other well known clock multiplier can be used.

Figure 4:
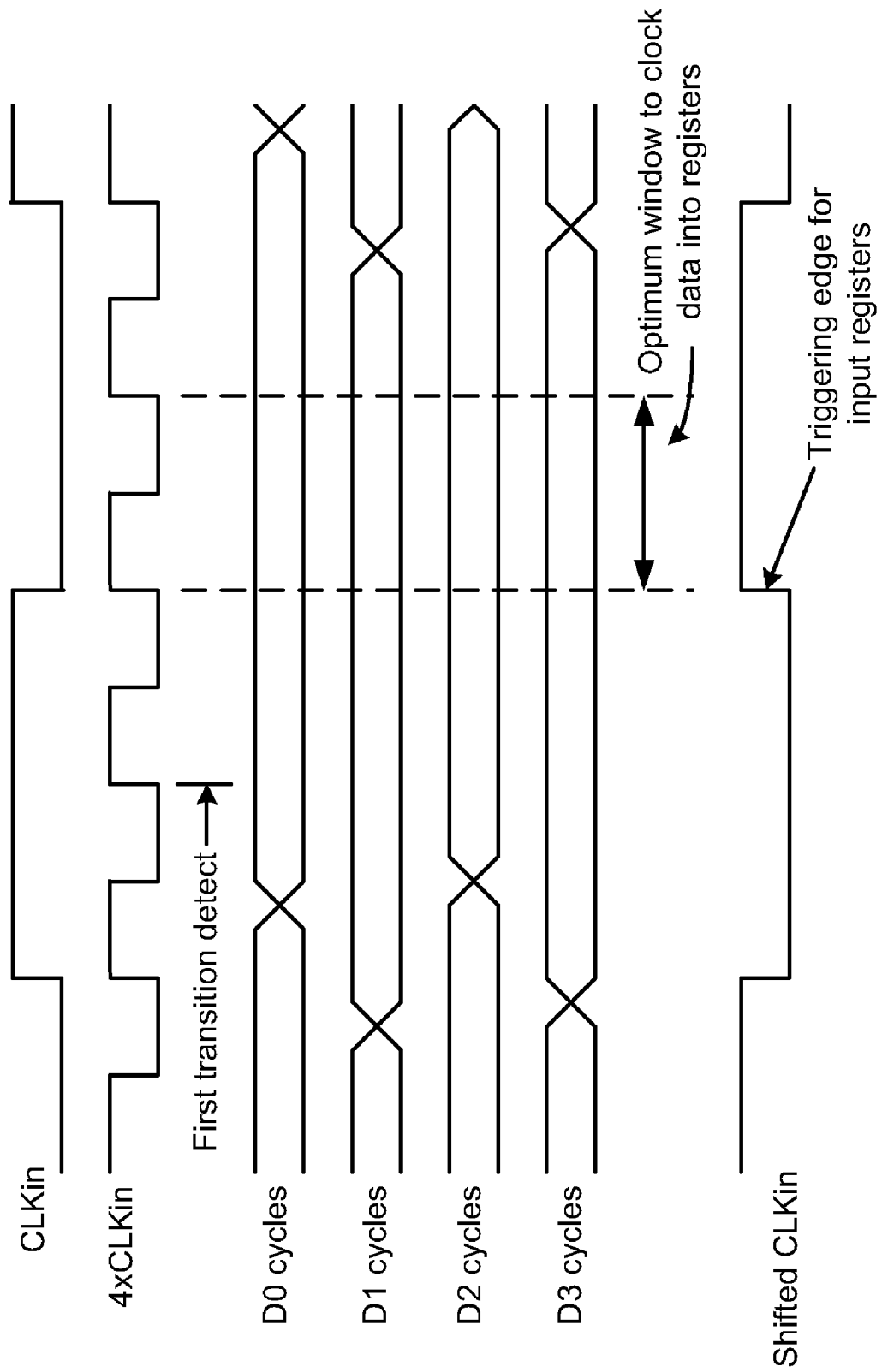
FIG. 4 illustrates various signals in the circuit of FIG. 3, showing the desirable time-shifting of an input clock for clocking the data into input registers.

FIG. 4 illustrates the CLKin waveform and the 4×CLKin waveform. Examples of the D0-D3 signals are also provided, showing arbitrary phase differences between the CLKin and data cycles due to differing propagation delays. Note that if the leading edge of the CLKin signal were used to clock the data bits into the input registers 24, the data bits D0 and D2 would be from one data cycle and the data bit D1 and D3 would be from a different data cycle, resulting in incorrect 4-bit words being processed.

A transition detector 26 outputs a transition detect signal whenever any one of the data bits D0-D3 has transitioned states during a 4×CLKin cycle. This may be done by exclusive ORing a data bit clocked at the trailing edge of one 4×CLKin cycle with the data bit clocked at the trailing edge of the next 4×CLKin cycle. If the two bits are not 0,0 or 1,1, then a transition during the 4×CLKin cycle has occurred, and a transition detect signal is then generated.

The transition detect signal is shifted by a half 4×CLKin cycle and then applied to a CLKin shifter 28. The CLKin shifter 28 selects one of the 4×CLKin cycles that starts around the midpoint of the data cycle containing the transitioned bit and then generates a time-shifted CLKin signal having a leading edge starting at the beginning of the selected 4×CLKin cycle. In the example of FIG. 4 using a 4×CLKin signal, the CLKin shifter 28 selects the first 4×CLKin cycle that occurs after the transition is detected as the start of the time-shifted CLKin signal. The CLKin shifter 28 could have instead selected the second 4×CLKin cycle after the transition was detected as the start of the time-shifted CLKin cycle and still obtained valid data. The time-shifted CLKin signal has the same period as the CLKin signal but has a phase selected based on the transition detect signal. As shown in FIG. 4, the CLKin shifter 28 effectively time-shifted the CLKin signal by two 4×CLKin cycles, which corresponds roughly to the midpoint of the data cycle.

Since the phase of the time-shifted CLKin signal depends only on the transition detect signal, the phase of the incoming CLKin signal can be arbitrary, and the phase of the time-shifted CLKin will still be at roughly the midpoint of the data cycle.

Figure 1:
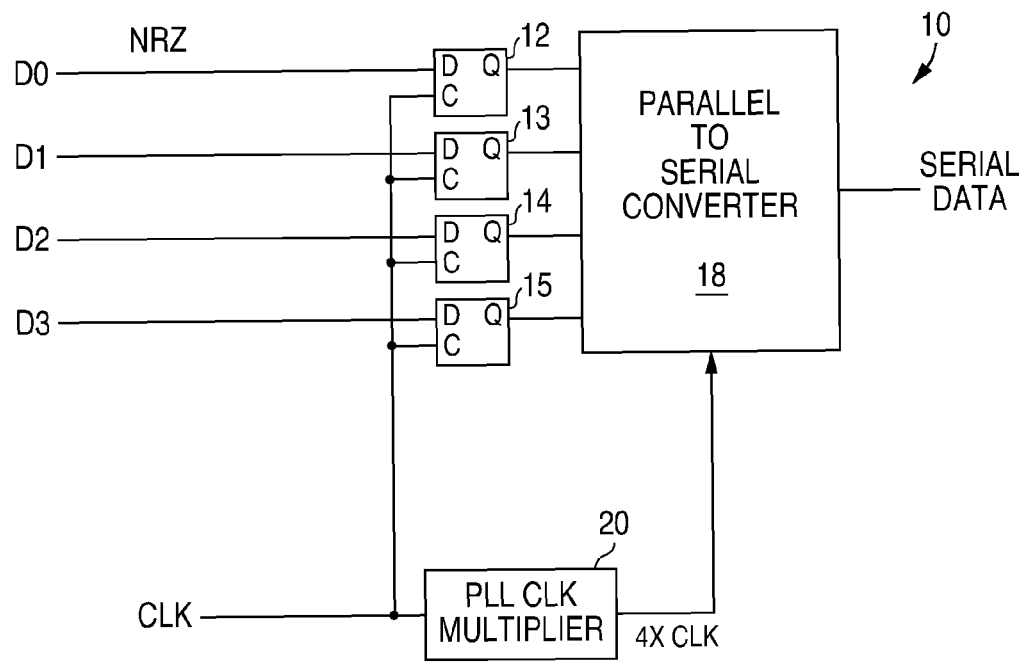
FIG. 1 illustrates a prior art circuit receiving data and clock signals.
Figure 6C:
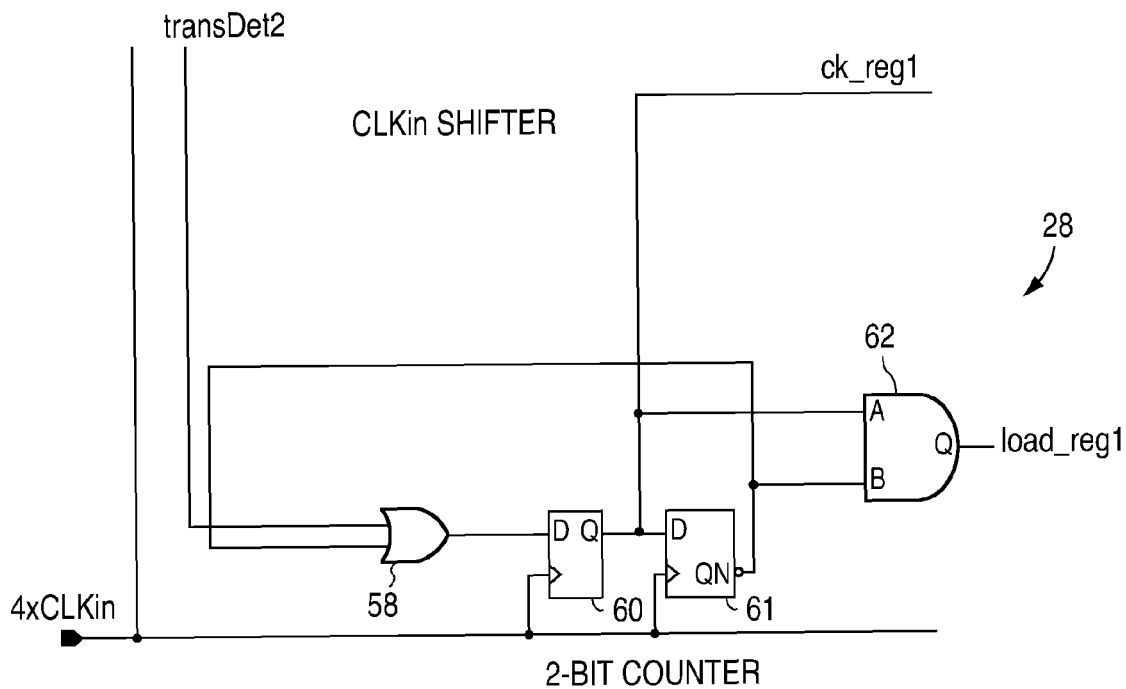
FIGS. 6B-6E together form a schematic diagram of one embodiment of the invention in conjunction with a parallel-to-serial converter for a 4-bit word.

Since the clock multiplier 25 multiplied the CLKin by four times, the CLKin shifter 28 may use a 2-bit counter, clocked by the 4×CLKin signal, to generate the shifted CLKin signal having the same period as the CLKin signal but shifted in time based on the transition detect signal. FIG. 6C shows such a 2-bit counter that may be used in the CLKin shifter 28.

Approximately the midpoint of the data cycle was selected for the leading edge of the time-shifted CLKin signal to occur since all the other data bits would have transitioned, if at all, by that time. Typically, the data bits have similar propagation delay times. The term "approximately the midpoint" is deemed to be the middle third of a data cycle.

In another embodiment, the clock multiplier 25 multiplies the CLKin by other than 4×. In one embodiment, the multiplied clock is 3×. In another embodiment, the multiplied clock is 5× or greater to provide additional precision in shifting the CLKin signal relative to the first data transition.

The time-shifted CLKin signal is then used to clock the data bits D0-D3 into the input registers 24.

The phrase "shifting the CLKin signal" refers to any phase adjustment of the CLKin signal by any means, such as by regeneration of the CLKin signal (e.g., using a counter) or actual delaying of the CLKin signal (using a delay circuit). The shifted CLKin signal may be considered to have been delayed or accelerated relative to the data cycle. If the CLKin shifter 28 were simply a controllable delay, such as a tapped series of inverters, the incoming CLKin signal may be applied directly to the CLKin shifter 28, as shown by the dashed line in FIG. 3

In the example of FIG. 3, the input registers 24 are inputs into a parallel-to-serial converter 32. Since the converter 32 loads each 4-bit word in parallel and outputs the 4 bits serially, the converter 32 uses a load clock 34 and a 4× serial clock. In one embodiment, the load clock 34 output is the same as the shifted CLKin signal but delayed by one 4×CLKin cycle to avoid any metastable states. The leading edge of the load clock loads the 4-bit word output from the input registers 24 into the converter 32. The multiplier 25 generates the 4× serial clock that clocks the serial bits out of a shift register that is loaded with the 4-bit word at the leading edge of the load clock. The 4×CLKin signal then shifts the data bits out serially.

In one embodiment, the clock synchronization circuit of FIG. 3 is part of a 2.5 GPON (gigabit passive optical network) single chip transceiver, where the parallel data is loaded at 312.5 Mbps (in parallel format) and the serial data is clocked out at 1.25 Gbps. Any other clock frequencies, such as 1 KHz-10 GHz, may be used.

Figure 5:
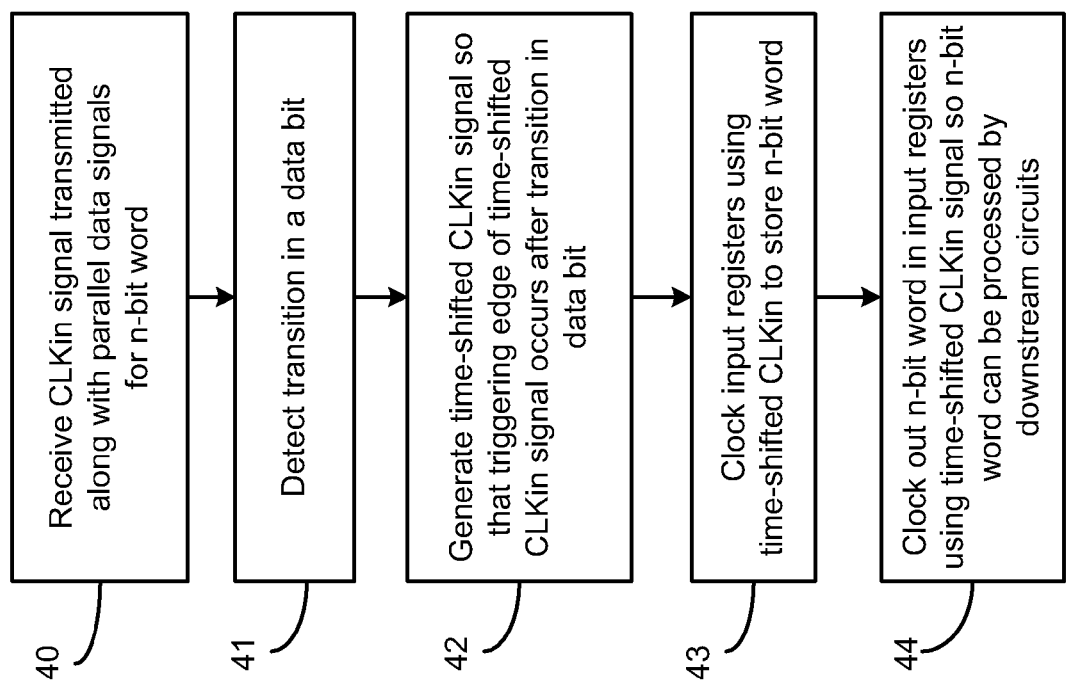
FIG. 5 is a flowchart illustrating various steps used to carry out one embodiment of the invention.

FIG. 5 is a flowchart summarizing the technique to synchronize the clock with a data transition. In step 40, the circuit receives the CLKin signal along with data signals, forming an n-bit word. The invention, however, may be used for circuits processing only one data bit at a time.

In step 41, a state transition is detected in the data.

In step 42, a time-shifted CLKin signal is generated with a triggering edge shifted with respect to the CLKin triggering edge so as to occur some time after the transition of the data. In one embodiment, the triggering edge of the CLKin signal is time-shifted to occur approximately in the middle of a data cycle to maximize the likelihood that all data bits in the n-bit word will have transitioned, if at all, prior to the triggering edge of the time-shifted CLKin signal, regardless of when the triggering edge of the incoming CLKin signal occurs.

In step 43, the input registers for the incoming data are clocked with the time-shifted CLKin to stored the n-bit word.

In step 44, the n-bit word is clocked out of the input registers for being further processed by downstream circuitry, such as a parallel-to-serial converter or other circuit.

FIGS. 6A-6E illustrate an actual embodiment of the circuit of FIG. 3. One skilled in the art will understand the operation of the circuit of FIGS. 6A-6E by the following brief description of the overall function of the circuit and the functions of the various components. The functional description is the same as that for FIG. 3. The parallel-to-serial portion of the circuit and its clocking are not relevant to the basic invention but are described for completeness.

FIG. 6A illustrates how the FIGS. 6B-6E are to be arranged and summarizes the functions of each of the circuit blocks.

Figure 6B:
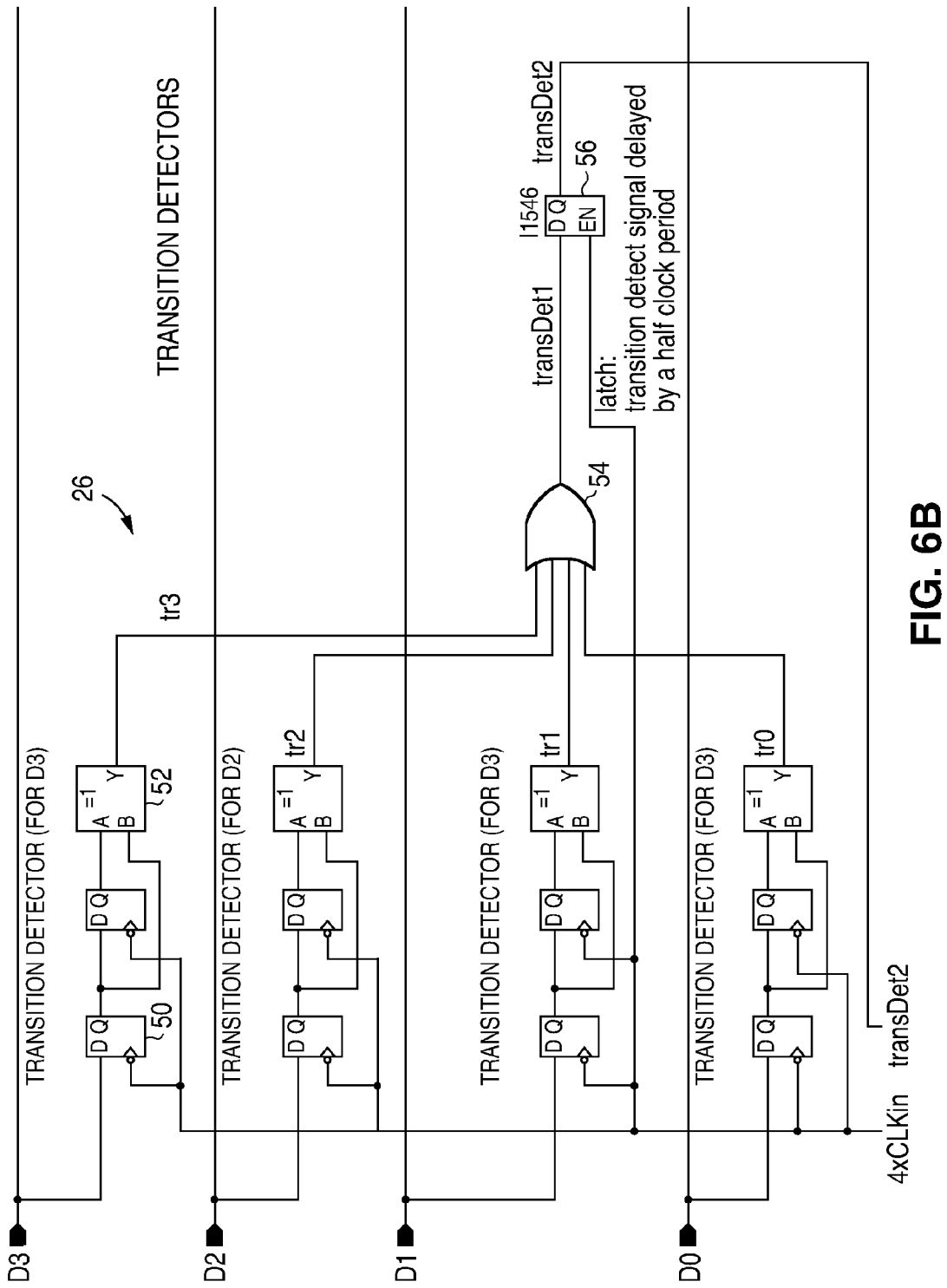

FIG. 6B illustrates the transition detector 26. D flip-flops 50 receive the D0-D3 data bits and are clocked with the trailing edge of the 4×CLKin signal output from a clock multiplier. An exclusive OR (XOR) gate 52 for each data bit detects if the data bit has changed state since the previous 4×CLKin clock cycle. The outputs of each XOR gate are connected to an OR gate 54. If any one data bit changes state since the previous clock cycle, the OR gate 54 outputs a high transDet1 signal to a latch 56. The 4×CLKin signal enables the latch 56 one-half cycle after the transition is detected, since the latch 56 is enabled by the leading edge of the 4×CLKin signal. The latch 56 then asserts the signal trans-Det2.

The transDet2 signal is applied to an OR gate 58 in the 2-bit counter of FIG. 6C (which is the CLKin shifter 28 in FIG. 3). The high transDet2 signal is output from the OR gate 58 and applied to the D flip-flop 60. The D flip-flop 60 outputs a high clock signal after the next 4×CLKin cycle, so the high output of the D flip-flop 60 occurs between 1.5 and 2.5 clock periods after the actual transition of a data bit (it is not known where within a 4×CLKin cycle a data bit transitions). The output of the D flip-flop 60 is labeled ck_reg1.

Figure 6D:
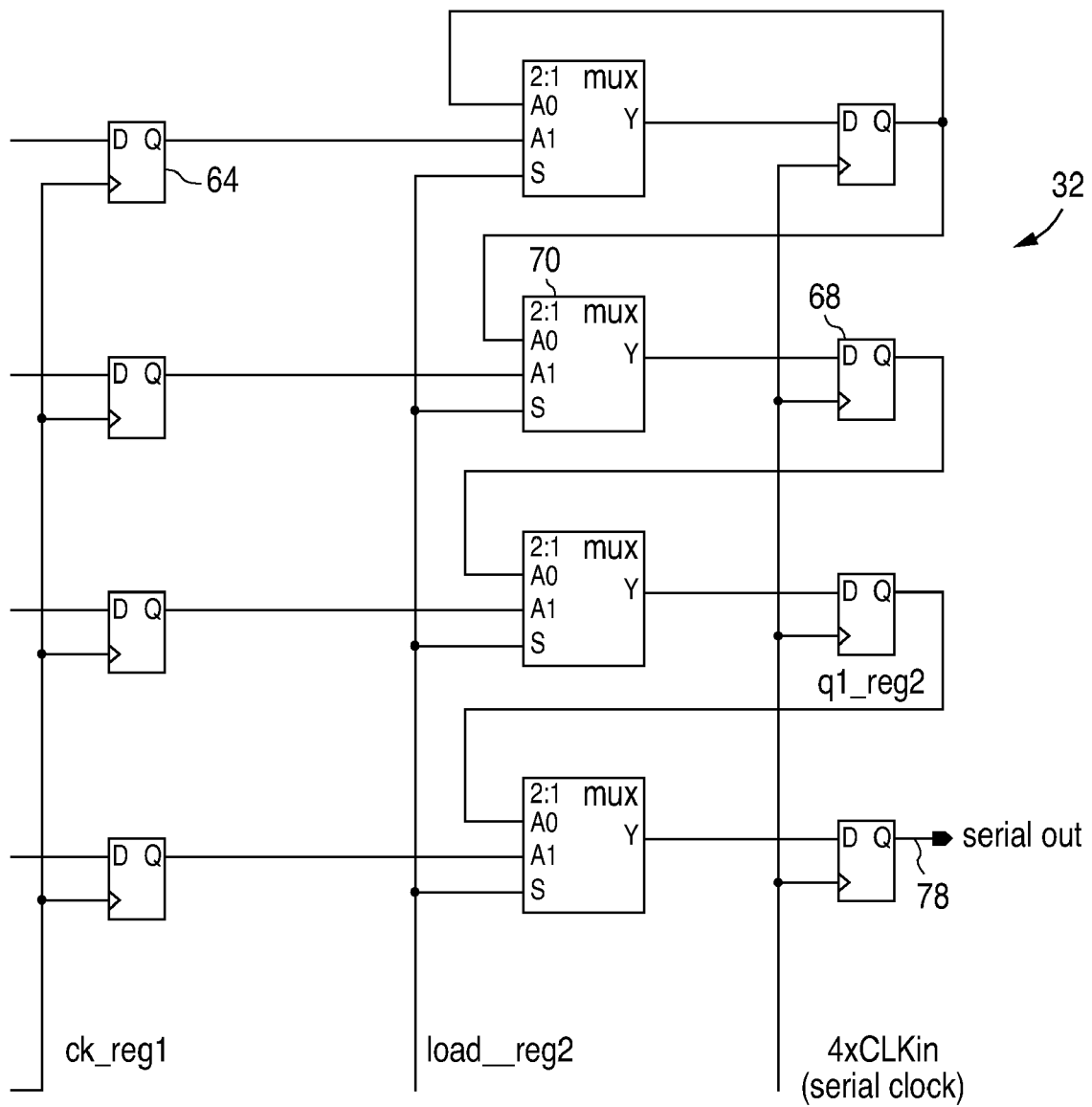

The leading edge of the c_reg1 signal clocks the input registers 64 in FIG. 6D for storing all the data bits D0-D3 between 1.5 and 2.5 clock periods after the actual transition of a data bit. This is around the midpoint of the data cycle for the transitioned data bit, since a data cycle is four of the 4×CLKin cycles.

The feedback loop of the 2-bit counter of FIG. 6C, including D flip-flop 61 and OR gate 58, causes the ck_reg1 signal to remain high for two of the 4×CLKin cycles and low for the next two 4×CLKin cycles. This results in the ck_reg1 clock to have the same frequency as the CLKin signal.

Figure 6E:
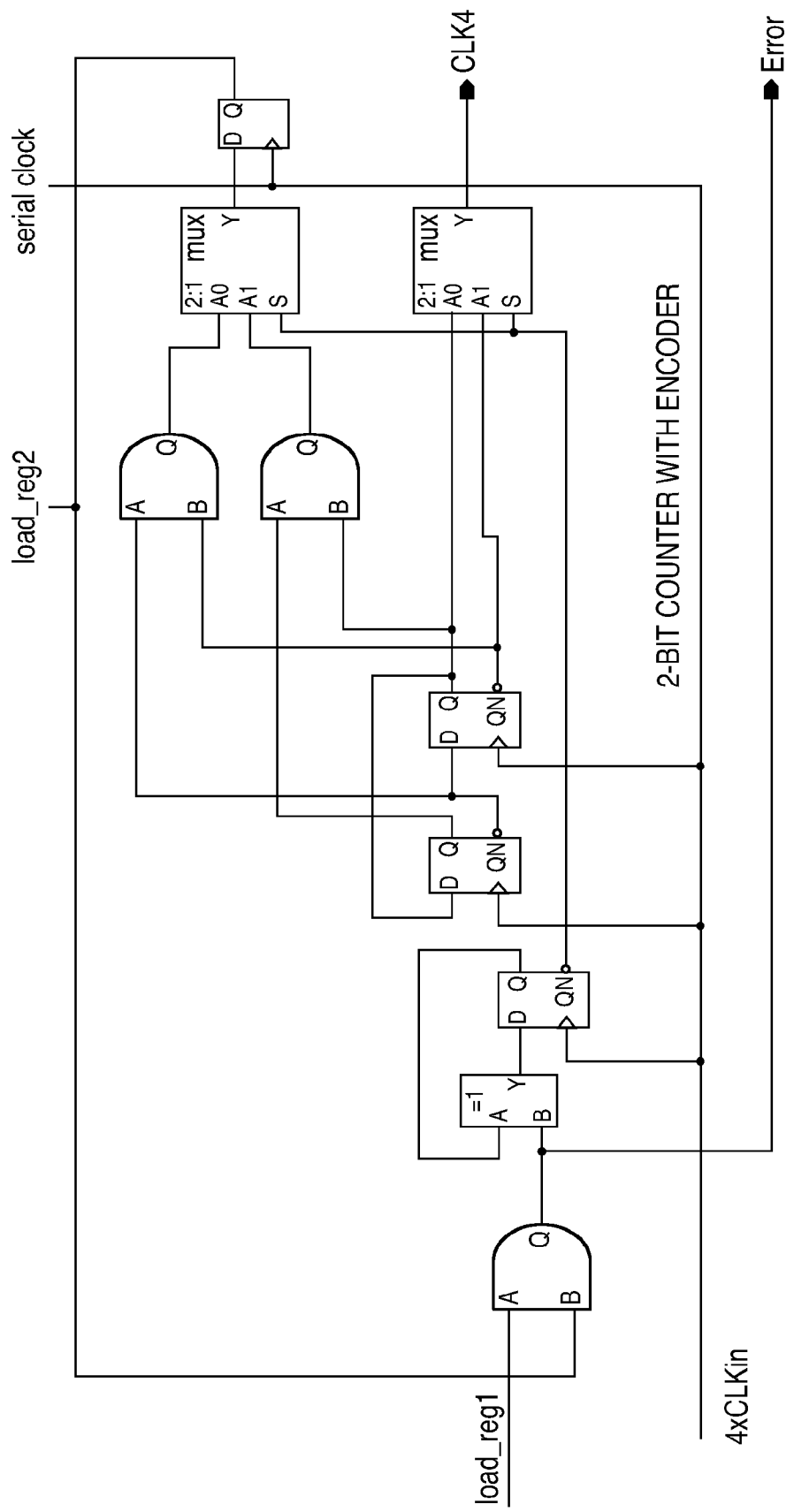

The AND gate 62 in FIG. 6C outputs a short pulse (signal labeled load_reg1), of a single 4×CLKin cycle, for controlling the loading of the 4-bit word from the input registers 64 (FIG. 6D) into the D flip-flops 68 (acting as a 4-bit shift register) in the parallel-to-serial converter 32 of FIG. 6D. Note that the load_reg1 pulse has a leading edge that occurs at the same time as the leading edge of the ck_reg1 pulse that controls the input registers 24. To ensure that the outputs of the input registers 24 are stable at the time of the loading of the 4-bit word into the D flip-flops 68, a load_reg2 signal, for triggering the loading of the 4-bit word into the D flip-flops 68, is generated one 4×CLKin cycle after the load_reg1 pulse. The 2-bit counter and encoder of FIG. 6E generates the load_reg2 clock. The circuit of FIG. 6E is optional if there is no problem with loading the shift register at the same time the input registers 24 are triggered.

The load_reg2 pulse (FIG. 6D) controls the 2:1 multiplexers 70 to select the A1 input, which is the output of the input registers 24, for loading the 4-bit word into the D flip-flops 68. The D flip-flops 68 are clocked using the 4×CLKin signal. After the short load_reg2 pulse, the multiplexers 70 then pass the AO input signal to their associated D flip-flops 68. The D flip-flops 68 are controlled by the 4×CLKin clock so that they are loaded at the leading edge of the load_reg2 pulse, then shift the bits through the multiplexers 70 and other D flip-flops 68 in the chain until the data bits are shifted out to the serial port 78.

Figure 7:
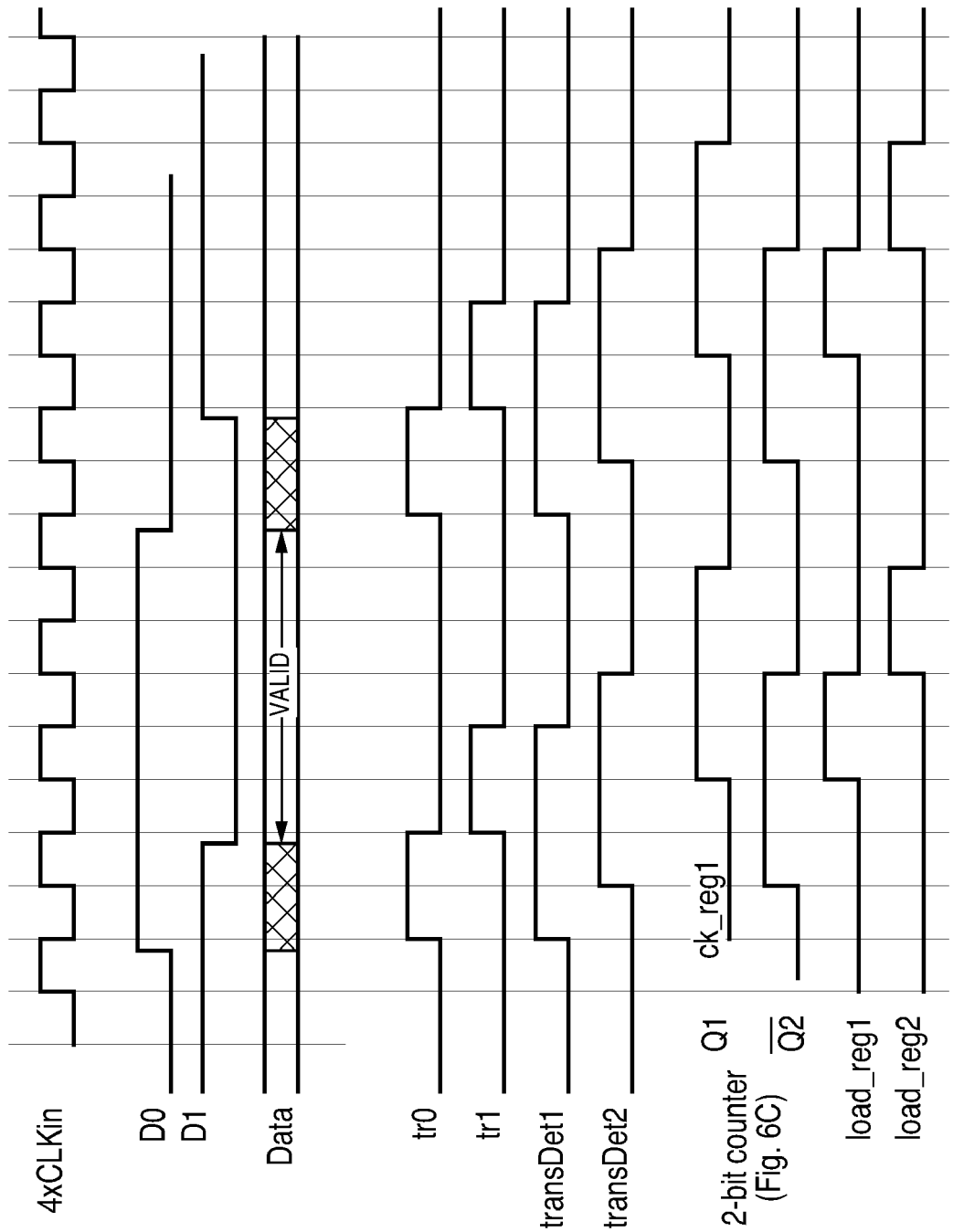
FIG. 7 illustrates examples of various signals generated in the circuit of FIGS. 6B-6E.

FIG. 7 illustrates examples of waveforms, described below, that may occur in the circuit of FIGS. 6A-6E.

The 4×CLKin signal is generated by a multiplier from the received CLKin signal.

D0 and D1 are examples of two of the data bits, where the data cycles for the two bits are shown skewed relative to each other so that they transition at slightly different times.

The "Data" waveform illustrates the valid window in which both the D0 and D1 signals can be clocked into the input registers 24 so that the states of the D0 and D1 bits in a 4-bit word are accurate.

The tr0 and tr1 signals are the transition detect signals from the D0 and D1 bit paths applied to the OR gate 54 in FIG. 6B.

The transDet1 signal is the output of the OR gate 54 in FIG. 6B pursuant to the transitions of the D0-D3 signals.

The transDet2 signal is the output of the latch 56 in FIG. 6B, which lags the transDet1 signal by one-half clock cycle.

The Q1 signal is the Q output of the D flip-flop 60 in FIG. 6C, which is the ck_reg1 signal that clocks the input registers 24 at the CLKin frequency but with a phase synchronized with the first transition of the data bits in a data cycle. Note that the triggering edge of the Q1 pulse occurs during the valid window of the data bits and approximately at the midpoint of the D0 data cycle.

The inverse Q2 signal is the inverted output of the D flip-flop 61 in FIG. 6C.

The load_reg1 signal is the output of the AND gate 62 in FIG. 6C. To ensure that the outputs of the input registers 24 are stable at the time of the loading of the 4-bit word into the shift register of the parallel-to-serial shift converter 32, the load_reg2 signal, for triggering the loading of the 4-bit word into the shift register, occurs one 4×CLKin cycle after the load_reg1 pulse.

In one embodiment, the entire circuitry of FIG. 3 or FIGS. 6A-6E is formed as a part of an integrated circuit.

The invention is applicable to any input circuit receiving a clock signal along with one or more data bits.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A circuit for automatically aligning a clock signal relative to a data signal comprising:
    at least one data terminal for receiving at least one digital data signal, the at least one digital data signal having a data cycle, wherein one transition per data cycle may occur;
    at least one clock terminal for receiving an input clock;
    a transition detector circuit connected to the at least one data terminal, the transition detector circuit being configured to provide a transition detect signal in response to a data signal received at the at least one data terminal transitioning states;
    a clock shifting circuit connected to the transition detector circuit, the clock shifting circuit being configured to generate a register load clock signal having a period equal to a period of the input clock, a triggering edge of the register load clock signal occurring some time after receiving the transition detect signal but before an end of a data cycle in which the transition occurred; and
    at least one input register clocked by the register load clock signal, wherein an input of the at least one input register is connected to the at least one data terminal, such that the at least one input register is clocked to store a data signal after the transition detect signal has been generated.

2. The circuit of claim 1 wherein the at least one data terminal comprises a plurality of data terminals for receiving an n-bit word, and wherein the transition detector circuit is configured to generate the transition detect signal upon detecting a transition of state of any data signal coupled to the plurality of data terminals.

3. The circuit of claim 1 further comprising a clock multiplier receiving the input clock and outputting a multiplied clock, the transition detector circuit and the clock shifting circuit being connected to the clock multiplier for being clock by the multiplied clock.

4. The circuit of claim 3 wherein the transition detector circuit comprises a first storage device having an input connected to the at least one data input terminal, the transition detector circuit further comprising a second storage device having an input connected to an output of the first storage device, wherein the first storage device and the second storage device are clocked by the multiplied clock, the transition detector circuit generating a transition detect signal if an output of the first storage device is different from an output of the second storage device.

5. The circuit of claim 4 wherein the transition detector circuit further comprises an exclusive OR gate receiving the output of the first storage device and the output of the second storage device and generating the transition detect signal if the output of the first storage device is different from the output of the second storage device.

6. The circuit of claim 5 wherein the at least one data terminal comprises a plurality of data terminals for receiving an n-bit word, and wherein the transition detector circuit further comprises at least two storage devices, clocked by the multiplied clock, and an exclusive OR gate for each data terminal to detect a transition of a data signal, an output of each exclusive OR gate being connected to an OR gate for outputting the transition detect signal upon detecting a transition of state of any data signal coupled to the plurality of data terminals.

7. The circuit of claim 1 further comprising a clock multiplier receiving the input clock and outputting a multiplied clock, the input clock having an input clock cycle and the multiplied clock having a multiplied clock cycle that is a fraction of the input clock cycle, wherein the clock shifting circuit is clocked by the multiplied clock, wherein the clock shifting circuit generates the register load clock signal starting after at least one multiplied clock cycle after the transition detect signal is generated.

8. The circuit of claim 7 wherein the clock shifting circuit comprises a counter for outputting the register load clock signal starting at a beginning of a multiplied clock cycle, the register load clock signal having a period equal to a period of the input clock.

9. The circuit of claim 7 wherein the clock shifting circuit is configured to generate the register load clock signal within a middle third of a data cycle in which the data signal transition occurred.

10. The circuit of claim 1 wherein the clock shifting circuit is configured to delay the input clock.

11. The circuit of claim 1 wherein the at least one input register comprises a plurality of D flip-flops triggered by the register load clock signal.

12. A method performed by a circuit, the circuit receiving a plurality of data bits in parallel to form an n-bit word, the circuit also receiving an input clock along with the data bits, the method comprising:
    detecting a transition of one of the data bits during a data cycle and generating a transition detect signal;
    shifting the input clock to generate a shifted clock, in response to the transition detect signal, so that a triggering edge of the shifted clock occurs sometime after generation of the transition detect signal; and
    clocking input registers, having inputs receiving the data bits, with the shifted clock so that the input registers store the data bits sometime after the generation of the transition detect signal.

13. The method of claim 12 further comprising multiplying the input clock to generated a multiplied clock having a multiplied clock cycle that is a fraction of an input clock cycle, wherein the shifted clock starts at a start of one of the multiplied clock cycles occurring after generation of the transition detect signal.

14. The method of claim 13 wherein shifting the input clock comprises selecting a multiplied clock cycle as a start of the shifted clock.

15. The method of claim 12 further comprising clocking contents of the input registers into a processing circuit as an n-bit word.

16. The method of claim 12 wherein the n-bit word is at least a 4-bit word.

17. The method of claim 12 wherein shifting the clock input causes a triggering edge of the shifted clock to occur within a middle third of a data cycle in which a data bit transition occurred.

18. The method of claim 17 further comprising generating a multiplied clock, the input clock having an input clock cycle and the multiplied clock having a multiplied clock cycle that is a fraction of the input clock cycle, wherein the shifting the input clock comprising generating the shifted clock to have a triggering edge starting after at least one multiplied clock cycle after the transition detect signal is generated.

19. The method of claim 12 wherein shifting the input clock comprises delaying the input clock.

* * * * *